United States Patent [19]

Kobayashi et al.

[11] Patent Number: 5,243,462
[45] Date of Patent: Sep. 7, 1993

[54] IMAGE STABILIZING APPARATUS

[75] Inventors: Takashi Kobayashi, Mitaka; Shigeru Ogino, Tokyo; Kazuhiro Noguchi, Kawasaki; Hirokazu Mogi, Kawaguchi; Hiroyuki Hamano; Sadahiko Tsuji, both of Yokohama; Nobuhiko Shinoda, Tokyo, all of Japan

[73] Assignee: Canon Kabushiki Kaisha, Tokyo, Japan

[21] Appl. No.: 991,712

[22] Filed: Dec. 16, 1992

Related U.S. Application Data

[63] Continuation of Ser. No. 807,657, Dec. 16, 1991, abandoned, which is a continuation of Ser. No. 516,303, Apr. 30, 1990, abandoned.

[30] Foreign Application Priority Data

Apr. 28, 1989 [JP] Japan .................................. 1-109501
Jul. 20, 1989 [JP] Japan .................................. 1-189721

[51] Int. Cl.$^5$ .............................................. G02B 27/64
[52] U.S. Cl. .................................................... 359/557
[58] Field of Search ................. 350/500; 359/554–557

[56] References Cited

U.S. PATENT DOCUMENTS

| | | | |
|---|---|---|---|
| 2,829,557 | 1/1950 | Jensen | 88/34 |
| 2,959,088 | 11/1960 | Rantsch | 88/1 |
| 3,504,957 | 4/1970 | Heflinger et al. | 359/557 |
| 3,756,687 | 9/1973 | Shin et al. | 350/500 |
| 3,910,693 | 10/1975 | De La Cierva | 352/244 |
| 3,944,324 | 3/1976 | Tajima et al. | 350/500 |
| 4,623,930 | 11/1986 | Oshima et al. | 350/500 |

FOREIGN PATENT DOCUMENTS 3542078 8/1986 Fed. Rep. of Germany.

*Primary Examiner*—Jon W. Henry
*Attorney, Agent, or Firm*—Fitzpatrick, Cella, Harper & Scinto

[57] ABSTRACT

An image stabilization apparatus of an inertial pendulum type corrects vibration of an image by a correcting optical device relatively displaceable with respect to a barrel. The apparatus includes a restriction device for generating an operational effect which changes according to a position of the correcting optical device for restricting the relative displacement of the correcting optical device, and a controller for changing the effect of the restriction device in accordance with a focal length or a direction of displacement of the correcting optical device.

45 Claims, 13 Drawing Sheets

IMAGE STABILIZING APPARATUS

This application is a continuation-in-part of U.S. application Ser. No. 07/807,657 filed Dec. 16, 1991, which is a continuation of U.S. application Ser. No. 07/516,303 filed Apr. 30, 1990, now both abandoned.

BACKGROUND OF THE INVENTION

Field of the Invention

The present invention relates to an apparatus for preventing an image for an optical apparatus from vibrating due to unintentional movement of the hands or the like.

Related Background Art

There are conventionally known optical apparatuses which are provided with a function for stabilizing an image generated due to unintentional movement of the hands.

For example, there is disclosed in the U.S. Pat. Nos. 2,959,088, 2,829,557 or the like such apparatus that is provided with a movable correcting optical system to prevent an image vibration by means of its force of inertia of the correcting optical system.

FIG. 15 shows an entire arrangement of an image stabilizing apparatus of this type.

In FIG. 15, lenses 1 and 2 are correction optical systems for stabilizing an image of main lenses 12 and 13 which are fixed to a lens barrel 4 for forming the image on a focal surface 14. Focal length of these correcting optical system are set as follows:

Assuming that a focal length of the lens 1 which has a negative power fixed to the lens barrel 4 is $f_1$ and a focal length of the lens 2 which has a positive power supported by a movable supporting member 3 is $f_2$, the following relation is satisfied:

$$F_1 = -f_2$$

The movable supporting member 3 is supported by the lens barrel 4 at a position of said focal length distance $f_2 (= -f_1)$ from the principal side of the lens 2 by means of gimbal 5 for movably supporting the movable supporting member in two axes.

FIG. 16 shows a mechanism of said gimbal 5 for movably supporting the two axes. In FIG. 16, the movable supporting member 3 which holds the lens 2 is supported by a supporting member 5y which is allowed to rotate around the Y axis. The supporting member 5y is supported by a supporting member 5x which is allowed to rotate around the X axis perpendicular to the Y axis. Then said supporting member 5x is supported by the lens barrel 4 so as to constitute a correcting optical system having rotation freedom around the two axes.

In FIG. 15, a counter weight 10 acts as a balancer for balancing the movable supporting member 3 and is mounted on the opposite side to the lens 2 of the movable supporting member 3 with the gimbal 5 therebetween so as to keep a balance with the lens 2 in respect to the gimbal 5.

Thus, with the above-mentioned arrangement, so-called image stabilizing, optical system of an inertial pendulum type can be realized. In other words, according to the arrangement of FIG. 15, vibration of an image can be prevented in the following manner:

If the arrangement shown in FIG. 15 constitutes, for example, a telescope, inside the barrel 4 which is positioned toward an object, an optical image of said object is formed on the focal plane 14 by the main lenses 12 and 13 and the correcting optical systems 1 and 2.

If this telescope has a high magnifying power and held by human hands when in use, vibration having a frequency component in a range from 0.1 Hz to 10 Hz or around is generated on said barrel 4 due to, in particular, movement of the hands or the like, then vibration of an image is generated.

However, according to the above arrangement, a relative displacement is generated between the lens 2 and the lens 1 for such vibration due to the inertial force of the movable supporting member 3 so that said vibration of an image can be suppressed by said relative displacement between the lens 2 and the lens 1.

Further, in FIG. 15, a member 9 mounted on the movable supporting member 3 is a non-magnetic conductor such as an aluminum chip and a damping force is generated in accordance with a speed of vibration of said barrel 4 due to a magnetic effect which is formed by magnets 6 and 7 fixed to the barrel 4. This is for generating a damping operation for preventing the movable supporting member 3 from abutting against the barrel 4 in such a case where, for example, the barrel 4 is abruptly displaced in order to change a design of the picture.

More practically, a eddy current generated from the aluminum chip 9 for the magnets 6 and 7, enlarged view of which is shown in FIG. 17, generates a force in a direction in which an amount of displacement of the movable supporting member 3 from a movable center position where an optical axis of the lens 2 meets the optical axis of the main lenses 12 and 13 (the main optical axis 15) is made smaller so as to obtain the damping effect.

Though the magnets 6 and 7 are mounted only on an upper part of the barrel 4, other details are intentionally omitted in this figure for convenience of the explanation, and it is needless to say that similar magnets are mounted on a lower part and on the both sides of the barrel 4 to thereby effect a two-axis control.

In FIG. 15, a magnetic member 11 is integrally mounted with said counter weight 10 on the movable supporting member 3 and performs a centering operation for returning the movable supporting member 3 to the movable center position at which the optical axis of the lens 2 coincides with the main optical axis 15 due to the magnetic effect which is formed with a magnet 8 fixed to the barrel 4. Such centering operation acts to remove a manufacturing error or a displacement corresponding to a direct current component out of the frequency components of the above-mentioned displacement so as to make the optical axis of the lens 2 meet the main optical axis 15.

In the concrete, as enlargedly shown in FIG. 7, the magnetic members 11 and the magnet 8 are constituted in such manner that surfaces of the same polarity (the N-poles) face each other to repel each other magnetically.

Then, since the center of said magnet 8 meets the main optical axis 15, such centering force as making the optical axis of the lens 2 meet the main optical axis 15 is generated.

Said arrangements for damping and centering improve, as described above, a performance of an image stabilizing apparatus due to the inertial pendulum system. However, on the other hand, relative displacement of the correcting optical systems (lenses 1 and 2) for correcting said image blurring is restricted by said arrangements so that the damping operation of an image stabilizing apparatus due to the inertial pendulum system is suppressed and the damping effect can not work satisfactorily.

SUMMARY OF THE INVENTION

Taking the above mentioned defect into consideration an object of the present invention is to provide an image stabilizing apparatus of the inertial pendulum system for correcting image vibration by means of correcting optical means relatively displaceably supported in respect to a barrel, in which apparatus there are provided restriction means for generating a force of action changing in accordance with a position of relative displacement of said correcting optical means for restricting the relative displacement of said correction optical means, and control means for changing an action of said restriction means in accordance with a focal length or a direction of displacement of said correcting optical means, so as to effectively improve the damping effect.

Other objects of the present invention will be clarified with reference to the embodiments described later.

DETAILED DESCRIPTION OF THE PREFERRED EMBODIMENTS

The embodiments of the present invention will be described below with reference to the attached drawings.

Figure 1:
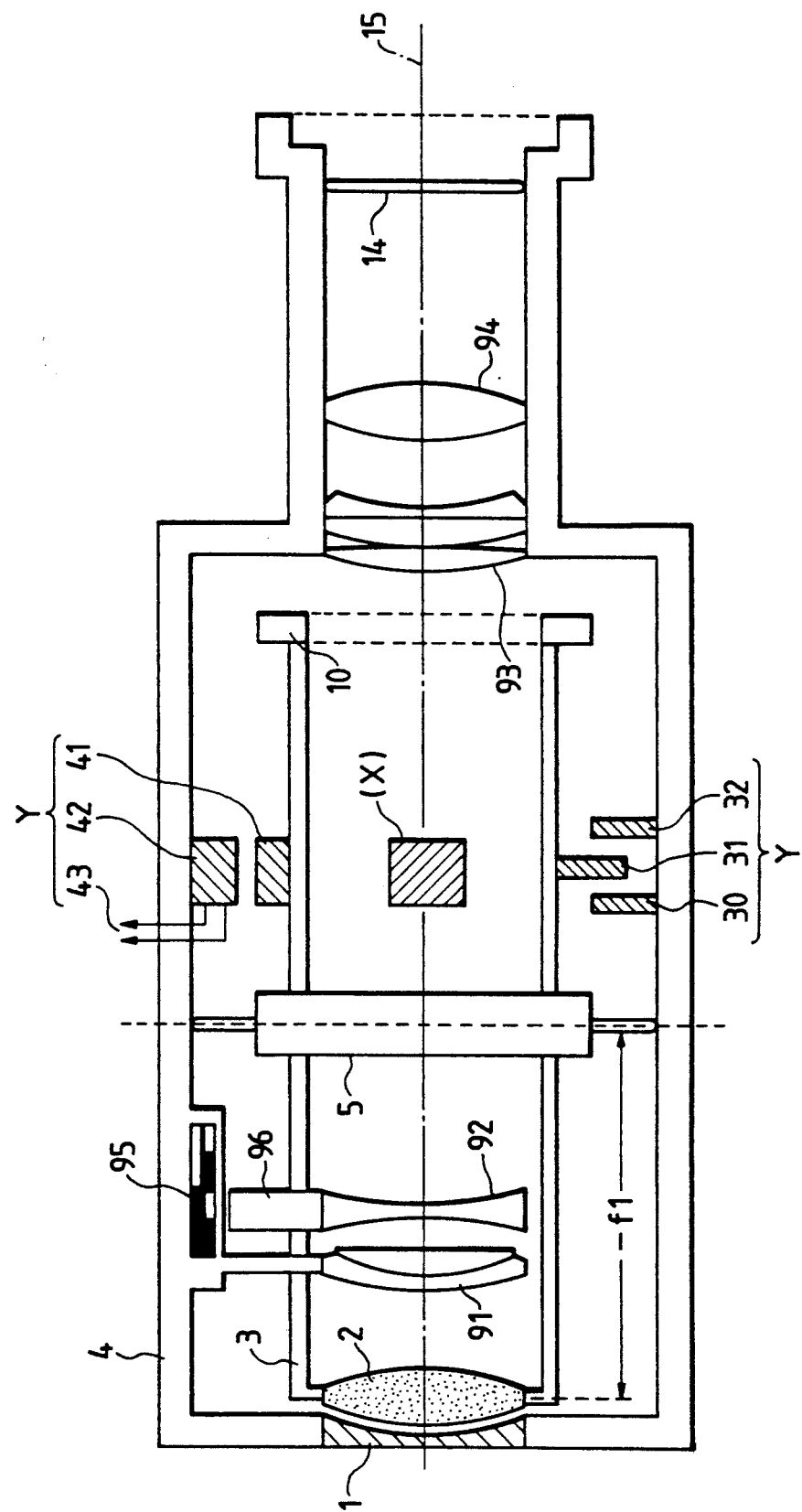
FIG. 1 is a view showing a structure of an image stabilizing apparatus according to an embodiment of the present invention.

FIG. 1 shows a structure of an image stabilizing apparatus according to the present invention.

Figure 15:
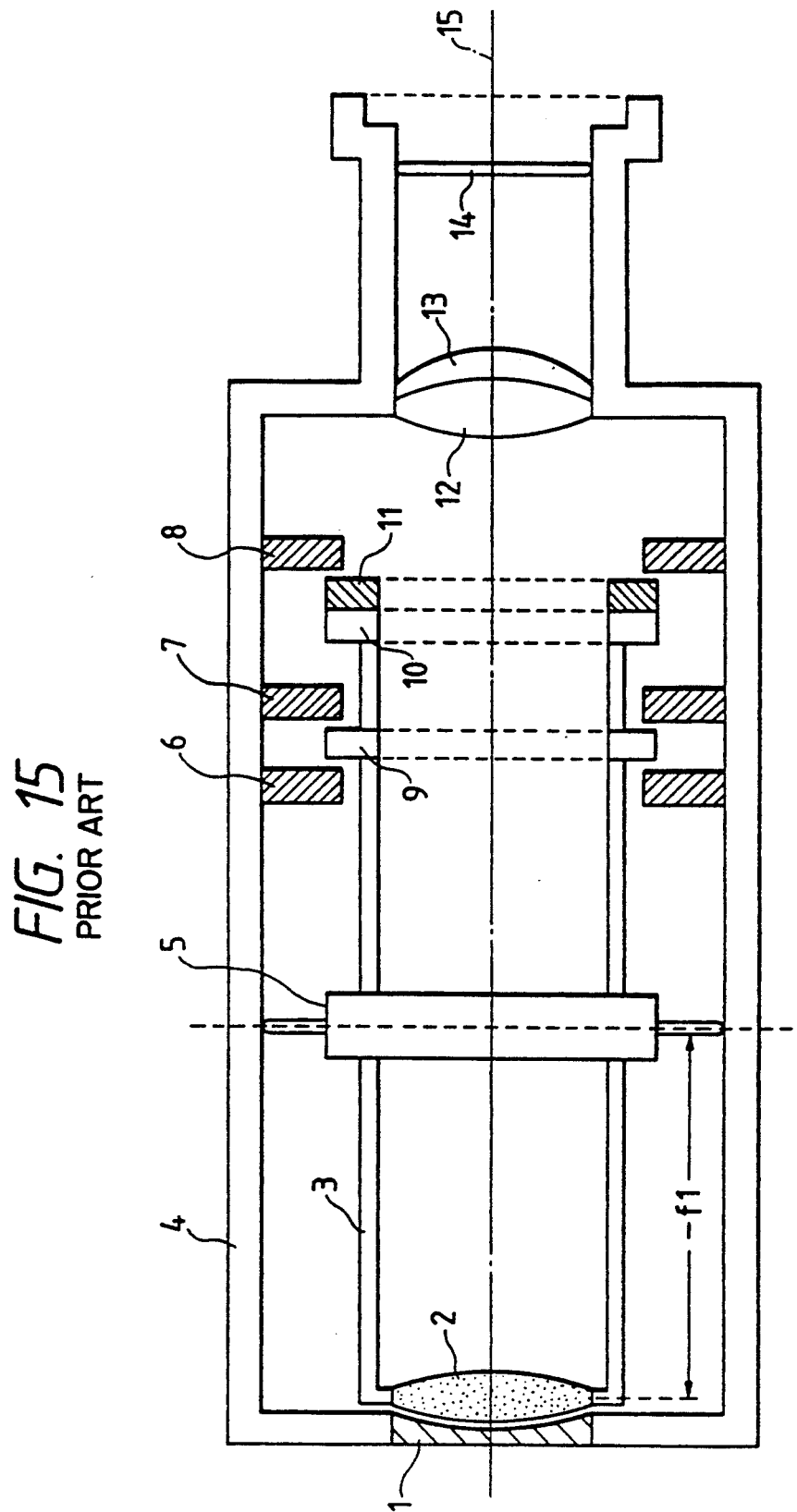
FIG. 15 is a view showing a structure of an image stabilizing apparatus of the prior art.
Figure 16:
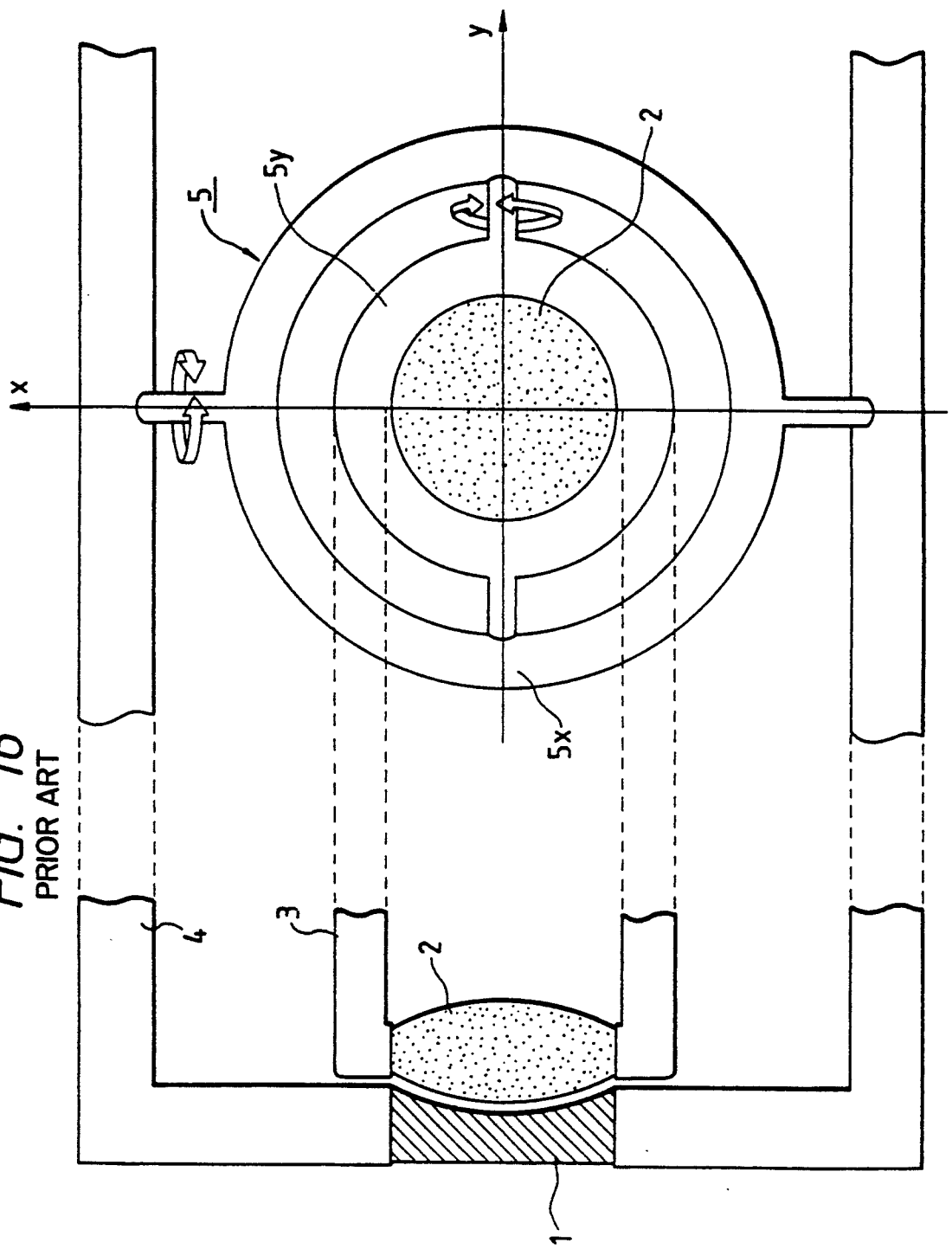
FIG. 16 is a view of an enlarged portion of the support of gimbal of FIG. 15 for explaining the structure thereof.
Figure 17:
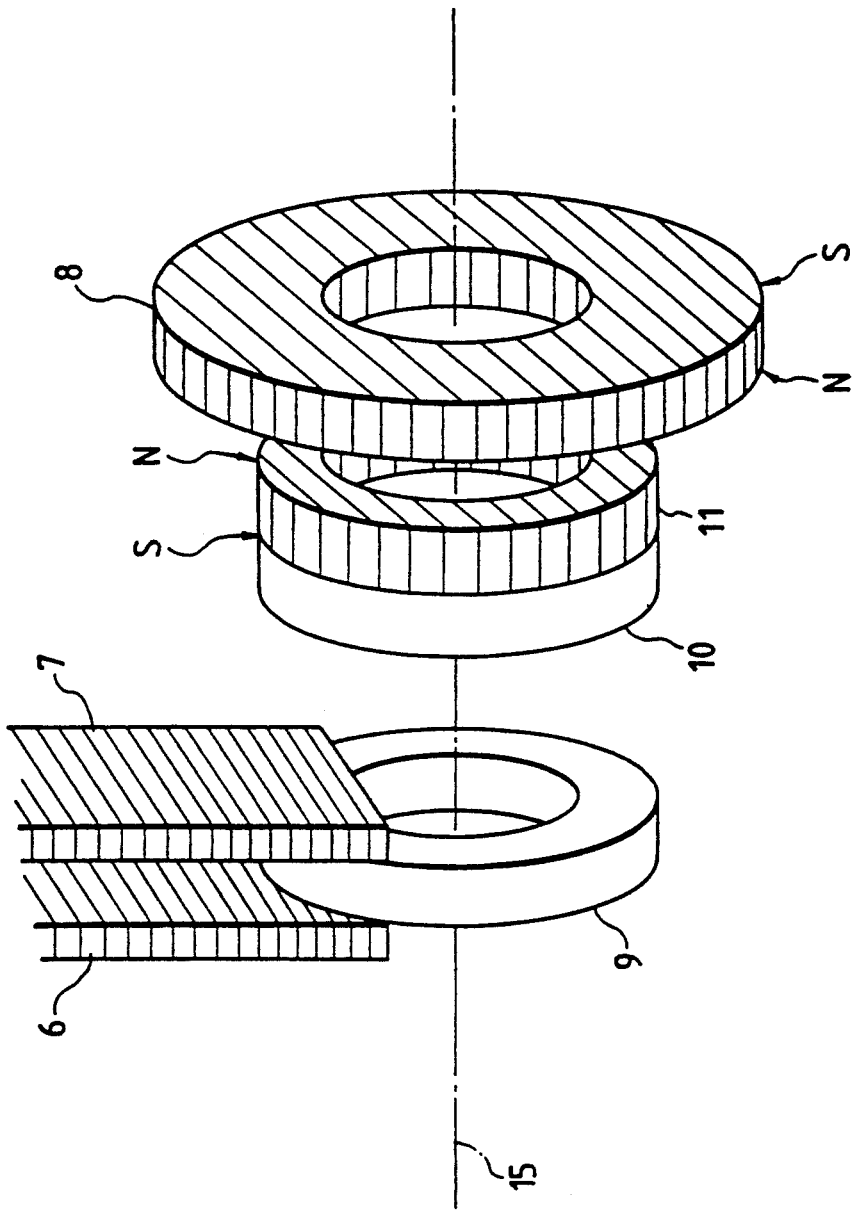
FIG. 17 is a view of an enlarged portion of the structure of FIG. 15.

The image stabilizing apparatus of FIG. 1 is operated under the inertial pendulum system in the same way as the above-described image vibration preventing apparatus of FIG. 15. In FIG. 1, identical portions to those in FIG. 15 are given the same numerals and description thereof will be omitted.

In FIG. 1, a main imaging optical system comprises a front lens 91, a magnification lens 92 and fixed lenses 93 and 94 for forming an image. The magnifications lens 92 is mounted movably for changing a focal length by means of a movable moving ring 96. A position of said magnification lens 92 can be detected by a magnifying encoder (ENC) 95 and it can be known from an output from such ENC 95 in what state a focal length of the imaging optical system is. In this connection, the ENC 95 exemplifies a 2-bit optical reflection type.

Sensors 30, 31 and 32 are arranged on an inner wall of a barrel 4 and on a movable supporting member 3, and torque generators 41, 42 and 43 are arranged symmetrically about the axes. The X axis and the Y axis are constituted in the same way, respective and are positioned perpendicular to each other.

Figure 2:
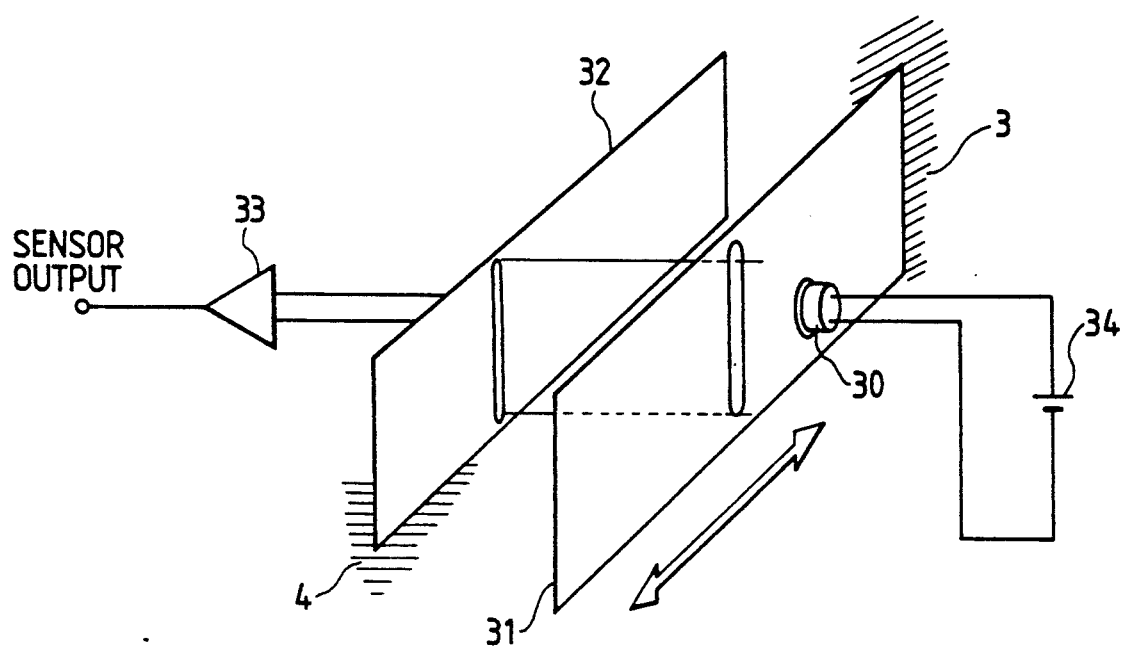
FIG. 2 is a view showing a structure of a sensor shown in FIG. 1.

Arrangements of said sensors 30, 31 and 32 are shown in FIG. 2. These sensors comprise a light-emitting device 30 such as a LED which is mounted on an inner wall of the barrel 4, a power source 34 for said light-emitting device, a one-dimensional light-receiving position detecting device 32 for receiving light from the power source 34, such as a PSD, and a slit screen 31 mounted on the movable supporting member 3. Since the slit screen 31 which is provided between the light-emitting device 30 and the one-dimensional light-receiving position detecting device 32 moves in a direction of an arrow in FIG. 2, together with movement of the movable supporting member 3 which holds a correcting optical system or the lens 2, a signal is detected from the one-dimensional light-receiving position detecting device 32 in accordance with a vibration angle thereof and which signal is output from a sensor amplifier 33 as a displacement signal of the movable supporting member 3 in respect to the barrel 4.

Figure 3:
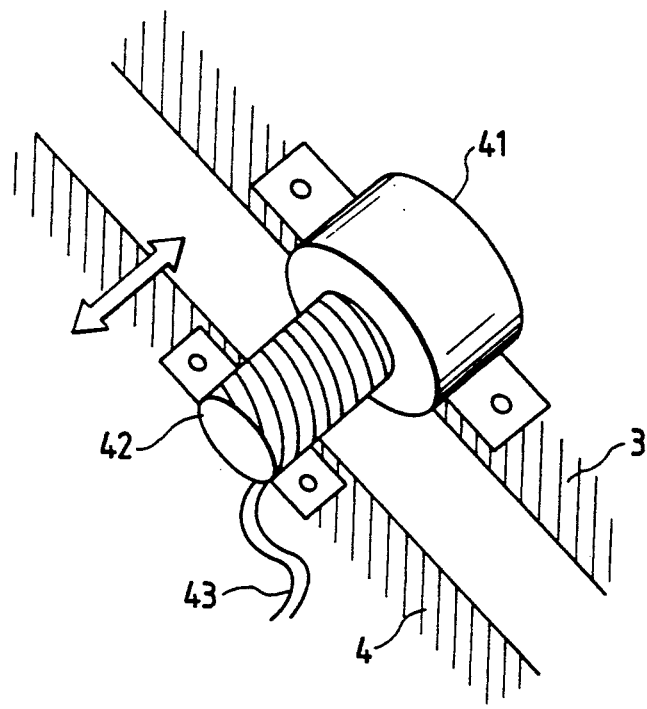
FIG. 3 is a view showing a torque generator shown in FIG. 1.

Next, one example of arrangement, which is called a voice coil type, of said torque generators 41, 42 and 43 is shown in FIG. 3.

When a control signal is entered into a control input terminal 43, a magnetic contacting force (or a magnetic repulsive force) is generated between a voice coil 42 and a magnet 41 in accordance with a current amount and a polarity of the signal to thereby generate torque in a direction of the arrow in FIG. 3.

As described above, the sensors 30, 31 and 32 and the torque generators 41, 42 and 43 are arranged in such a manner that the X axis and the Y axis are arranged perpendicular to each other and can effect torque control for rotation of the movable supporting member 3 around the X axis and around the Y axis in order to perform the damping and centering operations on movement of the movable supporting member 3 together with the support of gimbals.

Figure 4:
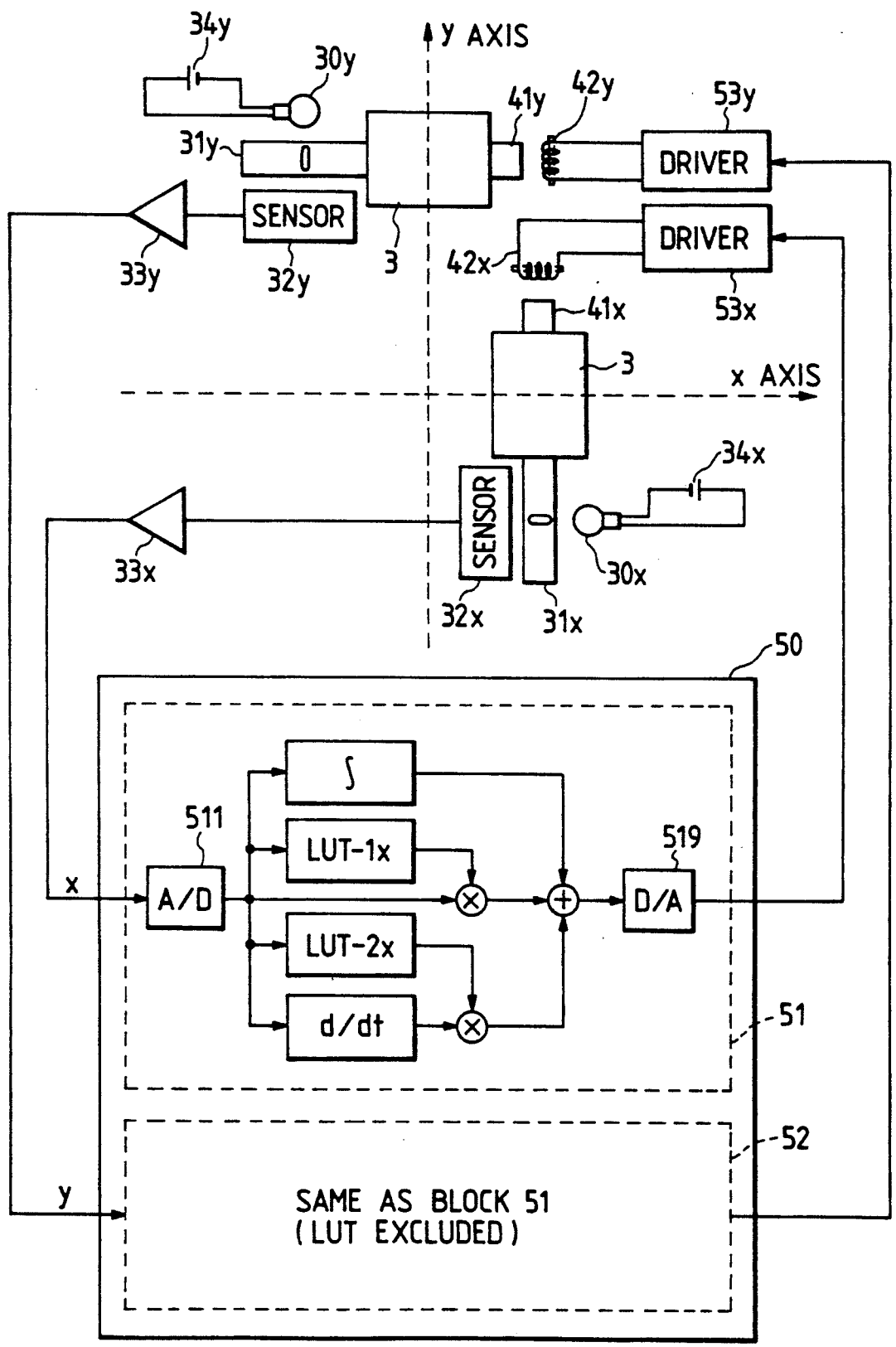
FIG. 4 is a view showing a structure of a control system of the apparatus of FIG. 1.

FIG. 4 shows a control system for inputting an output from said sensor amplifier 33, for controlling a drive of the torque generator 42 in accordance with a state of displacement of the movable supporting member in respect to the barrel 4 and for effecting torque control for rotation of the movable supporting member 3 around said X axis and Y axis.

In FIG. 4, a displacement signal of the movable supporting member 3 with respect to the barrel 4 from the sensor amplifier 33 for rotation of said movable supporting member 3 around the X axis and the Y axis is converted into a digital signal by means of an A/D converter 511 in a control circuit 50 constituted by a microcomputer and the like, and then processed by the control circuit 50. (In FIG. 4, sensor systems 30, 31, 32, 33 and 34 for the movable supporting members 3 are represented by 30x, 31x, 32x, 33x and 34x when they are mounted for rotation around the X axis and 30y, 31y, 32y, 33y and 34y for rotation around the Y axis.)

Then, a result of the processing by the control circuit 50 is converted into analog data by a D/A converter 519 to drive and to control the above-mentioned torque generator 42 via driving circuits 53x and 53y on the basis of said analog data (In FIG. 4, the above-mentioned torque generators 41 and 42 are represented by 41x and 42x when they are mounted for rotation of the movable supporting member 3 around the X axis and 41y and 42y when mounted for rotation around the Y axis.)

As a basic control operation in said control circuit 50, non-linear control torque for damping is generated by the torque generators 42x and 42y for a vibration angle of the movable supporting member 2 which is an inertial pendulum in order to satisfy two reciprocal purposes, that is, damping and prevention of an excess movement of a lens portion relating to a panning or tilting operation.

Figure 5:
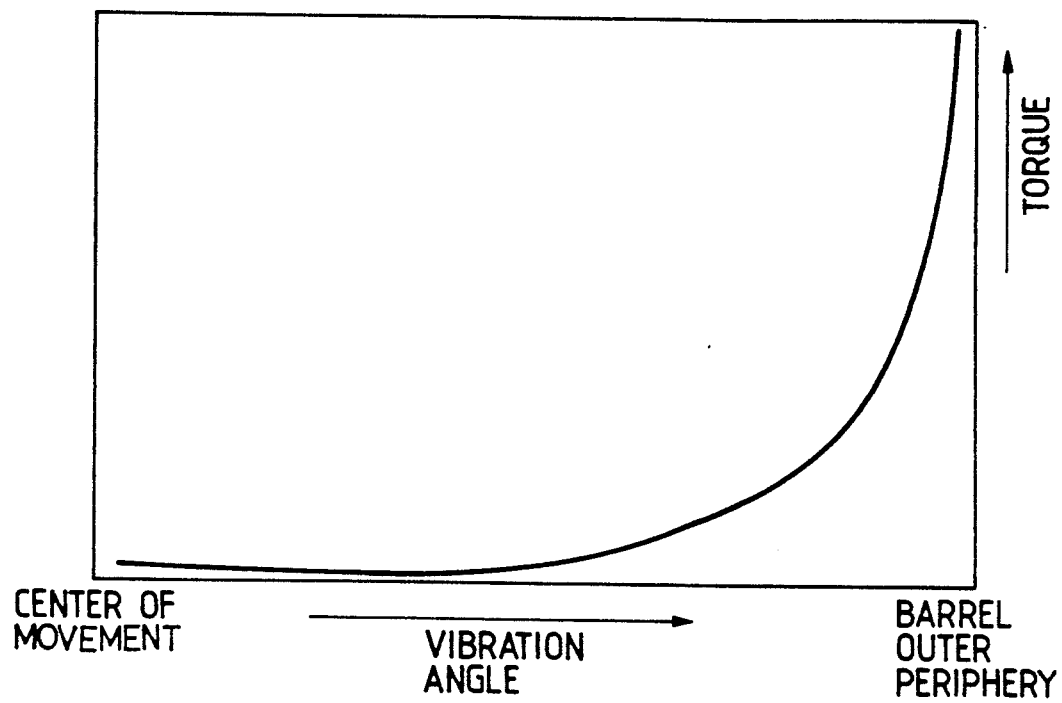
FIG. 5 is a graph showing characteristics of a control torque which is a base of the control system of FIG. 4.

Examples of characteristics of such control torque are shown in FIG. 5.

According to the characteristics of the control torque of FIG. 5, when the movable supporting member 3 is positioned around the center of rotation in respect the barrel 4, the torque generators 42x and 42y hardly generate torque for damping so as not to prevent the inertial pendulum from performing the damping operation.

On the other hand, when the barrel 4 is largely moved in a certain direction such as in a case of a panning operation (in which the lens barrel is moved in a horizontal direction in order to change a design of the picture) or tilting operation (in which the lens barrel is moved in a vertical direction in order to change the design of photograph), if the movable supporting member 3 is greatly displaced from the center of movement by the effect of the inertial pendulum, the damping torque which increases rapidly to bring the movable supporting member 3 back to the center of rotation is generated in the torque generators 42x and 42y to thereby prevent the movable supporting member 3 from abutting against the inner wall of the barrel 4.

Figure 6:
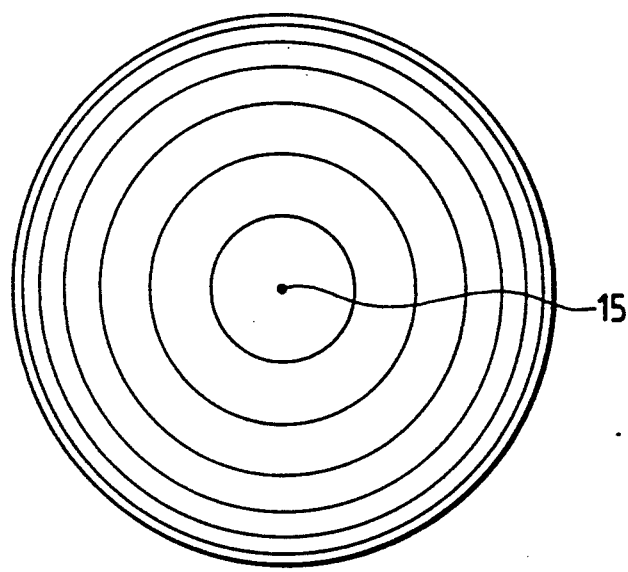
FIG. 6 is an imaginary view of the control torque of FIG. 5, seen from the main optical axis.

A torque curve in FIG. 5 can be, when seen from the direction of the main optical axis 15, imaged as shown in FIG. 6. Since one concentric circle in FIG. 6 shows a fixed amount of torque change, spaces between concentric circles become smaller the closer they come to the outer periphery or the barrel end and an inclination of the torque characteristics becomes sharper when the movable supporting member 3 is displaced more greatly from the center of movement.

In other words, the torque rises as shown as a non-linear curve in FIG. 5.

By controlling the damping torque in such a manner, the damping effect is greatly operated when the movable supporting member 3 comes close to the barrel 4 so as to prevent the movable supporting member 3 from abutting against the inner wall of the barrel 4. In other cases, such damping effect is made as small as possible so as not to prevent the damping action by the inertial pendulum.

In order to realize the control characteristics of FIG. 5, the control circuit 50 selects coefficients $K_1$ and $K_2$ with which a torque curve as shown in FIG. 5 can be obtained in accordance with a vibration angle $\theta$ of the movable supporting member 3 to be entered from, for example, the sensor amplifiers 33x and 33y from a look up table (LUT) which is stored in a memory in the control circuit 50 so as to calculate the following control function.

$$DATA = K_1 * \theta + K_2 * d\theta/dt + S\theta dt$$

where said symbol * means a multiplication/ function and said data is made to be generated as control torque in the torque generators 32x and 42y.

In said control function, the term "$K_1 * \theta$" acts as a spring term for generating a centering force in accordance with an amount of displacement from the center of movement of the movable supporting member 3, term "$K_2 * d\theta/dt$" is a damping term having an effect on a rapid panning, tilting or other operation, and the term "$S\theta dt$" is for a centering operation and has such an effect which cancels an error generated due to various causes such as a storing error or a manufacturing error in a mass production so as to bring the movable supporting member 3 back to the center of movement. In such integral terms, since an influence on the control system is set small, a non-linear processing is not performed, different from in other terms.

Figure 7:
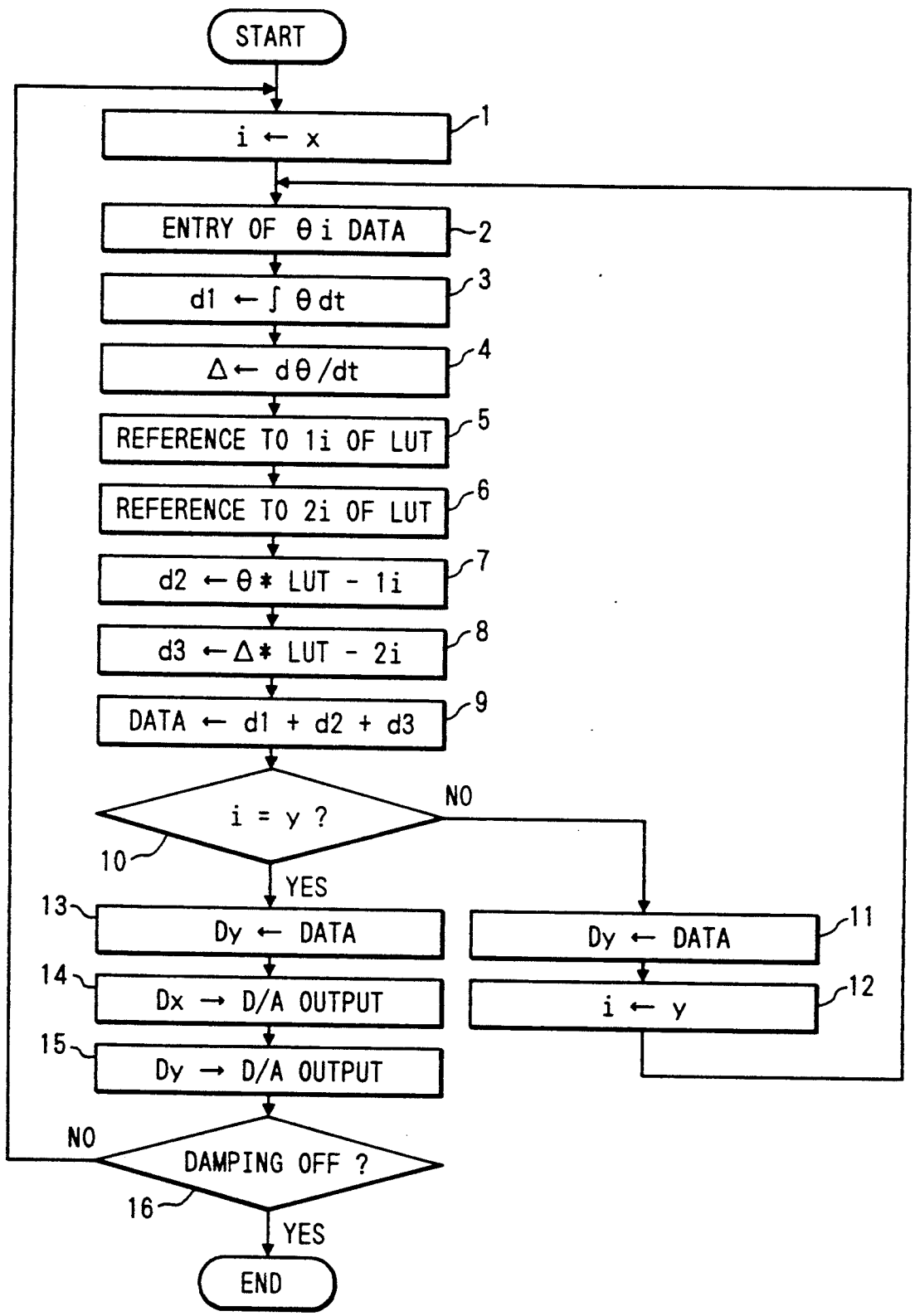
FIG. 7 is a flowchart showing a practical operation of the control system of FIG. 4.

Next, an operation of the control system of FIG. 4 will be described with reference to the flowchart in FIG. 7.

Since the two arrangements within the frames indicated by the dot lines 51 and 52 of the control system 50 in FIG. 4 are the same except the coefficient data of said LUT, details of the arrangement within the frame of the dot line 52 are omitted for simplification.

Besides, among the arrangement within the frame of the dot line 51, parts other than the A/D converter 511 and the D/A converter 519 show details of the processing in the control circuit 50 in the form of hardware.

Figure 8:
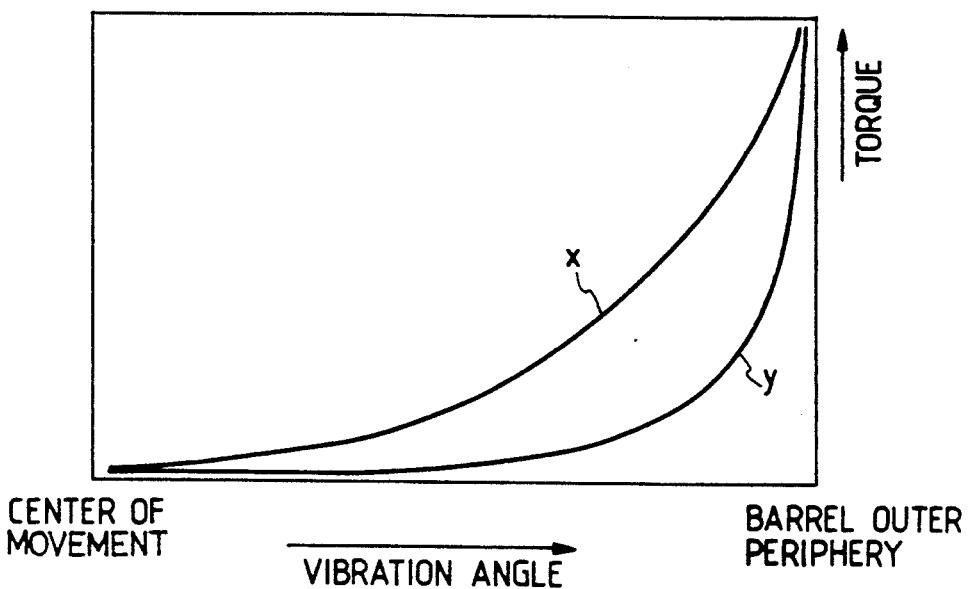
FIG. 8 is a graph showing characteristics of control torque when the characteristics of the control torque around the X axis are different from those of the control torque around the Y axis in the control system of FIG. 4.

In this embodiment, the coefficients $K_1$ and $K_2$ of said control function is set in such a manner that for the non-linearity of said control torque, the control torque for rotation around the X axis (the vertical axis) becomes stronger than that for rotation around the Y axis (the horizontal axis) together with displacement of the movable supporting member 3 from the center of movement as shown in FIG. 8.

Figure 9:
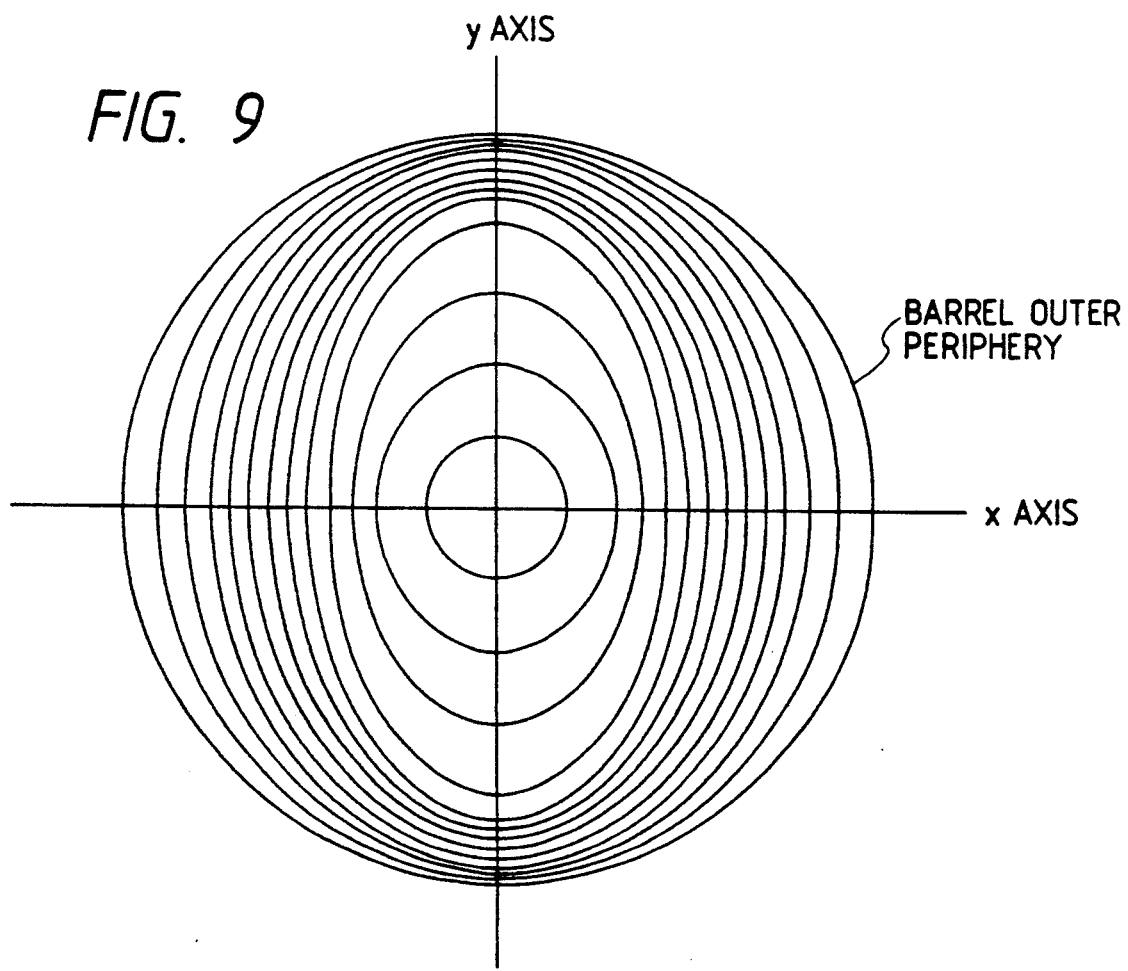
FIG. 9 is an imaginary view of the control torque of FIG. 8 seen from the main optical axis side.

That is, it is arranged that weaker control torque for bringing the movable supporting member 3 back to the center position of movement is given for rotation around the Y axis than for that around X axis. An image of such situation seen from the direction of the main optical axis 15 is shown in FIG. 9. In FIG. 9, one concentric circle shows a predetermined amount of a torque change.

Because of such arrangement, when an ordinary optical apparatus such as a cam coder is supposed to be used, the rotation around the X axis of the movable supporting member 3 is made suitable for the panning operation in comparison with the rotation around the Y axis taking into consideration a condition of use of the apparatus or of generation of unintentional vibration of the hands. On the contrary, the rotation around the Y axis is made suitable for the damping action in comparison with the rotation around the X axis.

In other words, when an ordinary optical apparatus such as a cam coder is supposed, it is known that the frequency of panning operations in a horizontal direction is generally high, while the frequency of tilting operations in a vertical direction is low.

It is also found from measurement data, etc., that the hands of an amateur user vibrate in a vertical direction a little more greatly than in a horizontal direction.

Taking the above-mentioned conditions into consideration, it is arranged that the control torque, which is a counter-measure to a great movement such as a panning operation and has a negative effect on the firstly aimed damping operation as described before, is given for rotation of the movable supporting member 3 around the Y axis more greatly than that around the X axis so as to make the rotation of the movable supporting member 3 around the X axis more suitable for the panning operation than the rotation around the Y axis and to make the rotation around the Y axis more suitable for the damping effect than the rotation around the X axis. Thus, it is arranged that the control torque is given effectively without disturbing the damping operation.

The above-mentioned operations will be described below in accordance with the procedures of the control system in FIG. 4.

Step 01: In order to calculate a control torque signal for rotation around the X axis of the movable supporting member 3 (in a horizontal direction), designate the processing mode i as X.

Step 02: Enter an output $\theta$ from the sensor amplifier 33x (hereinafter called "$\theta x$") according to a vibration angle of the movable supporting member 3 around the X axis via the A/D converter 511 as digital data.

Step 03: Integrate the above data $\theta x$ (S$\theta xd\theta$) to obtain data d1.

Step 04: Differentiate the above data $\theta x$ (d$\theta x$/d$\theta$) to obtain data $\Delta$.

Step 05: Read the coefficient $K_1$ for said control function corresponding to the above $\theta x$ out of a LUX-1x which stores the coefficient $K_1$ for obtaining the control torque of FIG. 8 for rotation around the X axis of the movable supporting member 3.

Step 06: Read the coefficient $K_2$ for said control function corresponding to the above $\theta x$ out of a LUT-2x which stores the coefficient $K_2$ for obtaining the control torque of FIG. 8 for rotation around the X axis of the movable supporting member 3.

Step 07: Multiply the above $\theta x$ by the coefficient $K_1$ thus read to make it data d2.

Step 08: Multiply the above $\Delta$ by the coefficient $K_2$ thus read to make it data d3.

Step 09: Add the above data d1, d2 and d3 together to temporarily store as "DATA". That is, a result of calculation of said control function can be obtained by the following expression.

$$\text{DATA} = d1 + d2 + d3$$
$$= K_1 \cdot \theta x + K_2 \cdot d\theta x/dt + S\theta xdt$$

Step 10: Judge whether the current processing mode i is relating to a rotation around the X axis or a rotation around the Y axis of the movable supporting member 3.

If the current processing is in an odd time, the current processing mode i is for rotation around the X axis (in case of No) and the processing advances to Step 11.

If in an even time, is i for the Y axis (in case of YES) and the processing advances to Step 13.

Step 11: Store "DATA" which is a result of calculation in DX as control torque data in a horizontal direction.

Step 12: Change the processing mode from i to y and return the processing to Step 02. Next, perform the processing for calculation of a control torque signal for rotation around the Y axis (in a vertical direction of the movable supporting member 3 in the similar way to that for the above processing for the X axis. coefficient $K_1$ corresponding to the vibration angle $\theta$ of the movable supporting member 3 around the Y axis (hereinafter called "$\theta y$" is read out of a LUT-1y which stores the coefficient $K_1$ of said control function for obtaining the control torque of FIG. 8 for rotation around the Y axis of the movable supporting member 3, while in Step 06 the coefficient $K_2$ for said control function corresponding to the vibration angle $\theta y$ of the movable supporting member 3 around the Y axis is read out of a LUT-2y which stores the coefficient $K_2$ for obtaining the control torque of FIG. 8 for rotation around the Y axis of the movable supporting member 3.

Step 13: Store "DATA" which is a result of calculation as control data in a vertical direction.

Step 14: Output the data "DX" from the D/A converter 519x to a driving circuit 53x to effect torque control on rotation around the X axis of the movable supporting member 3.

Step 15: Output the data "DY" from the D/A converter 519y to the driving circuit 53y to effect torque control on rotation around the Y axis of the movable supporting member 3 on the basis of the data "DY".

Step 16: Judge whether an image vibration correcting operation should be terminated or not.

If it should be terminated (if Yes), terminate the operation, and if it should be continued (if No), return the processing to Step 01 to repeat the above operation to the end.

In such a manner, when the movable supporting member 3 comes close to the inner wall of the barrel 4 due to the panning or tilting operation, torque having such characteristics as shown in FIG. 8 is generated by the torque generators 41x, 42x and 43x around the X axis and by the torque generators 41y, 42y and 43y around the Y axis so as to return the movable supporting member 3 to the center of rotation.

Figure 10:
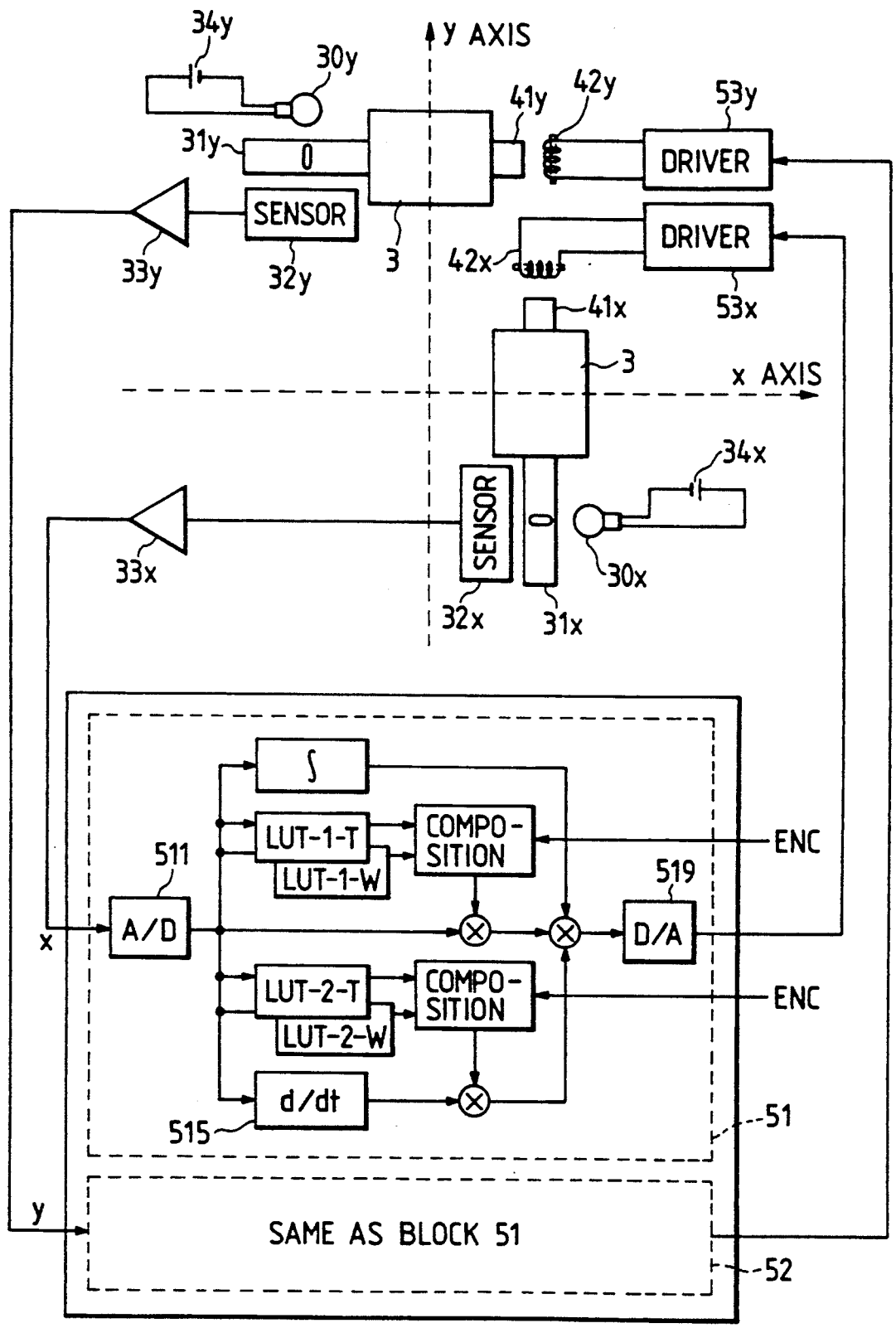
FIG. 10 is a view of a structure of a control system for explaining another example of a practical operation of the control system of FIG. 4.

Next, another example of the operation of the control system in FIG. 4 will be described with reference to the control system of FIG. 10 and the flowchart of FIG. 11 thereof.

In this example, only a manner of determining a coefficient relating to the above-mentioned control for calculating said control torque is different from that in the control system of FIG. 4. Portions other than that are identical to those in the control system of FIG. 4 and are given the same numbers as those in FIG. 4, and description of which portions will be omitted.

Since the two arrangements in the frames indicated by the dot lines 51 and 52 in the control system 50 in FIG. 4 are identical to each other except the above-mentioned coefficient data of the LUTs, details of one arrangement (in the frame indicated by the dot line 52) are omitted for simplification. Among the arrangement within the frame 51, parts other than the A/D converter 511 and the D/A converter 519 show details of the processing in the control circuit 50 in the form of hardware.

Figure 12:
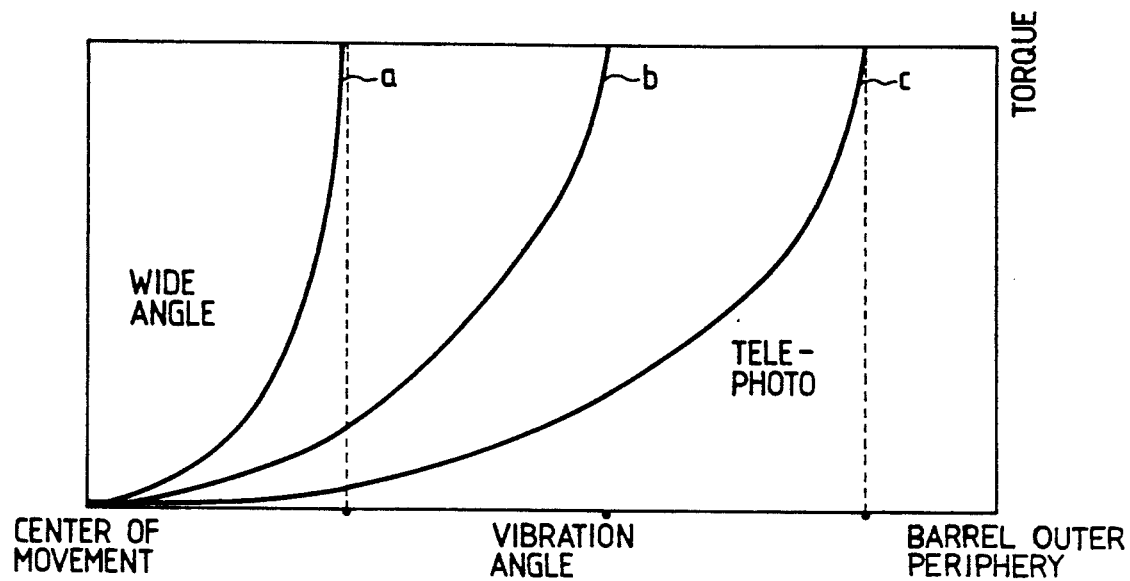
FIG. 12 is a graph showing characteristics of control torque in a case where the characteristics of control torque are different in accordance with a focal length in the control system of FIG. 10.

The present example is characterized in that said control torque is given for a wide angle more strongly than for a telescope in accordance with an output from a focal length encoder (ENC) 95, which is shown in FIG. 12. In FIG. 12, with a change of the focal length from the telescopic end (a long focal length) to the wide angle and (a short focal length), the control torque curve is changed to have non-linear characteristics to which stronger torque is given, as (c) to (b), and to (a).

In order to do so, there are set in the control circuit 30, the coefficients $K_1$ and $K_2$ of said control function according to the vibration angle $\theta$ of the movable supporting member 3 for giving a torque curve (a) at the wide angle end to the LUT, and the coefficients $K_1$ and $K_2$ of said control function according to the vibration angle $\theta$ of the movable supporting member 3 for giving a torque curve (c) at the telescopic end. Then, after being selected according to the vibration angle $\theta$ of the movable supporting member 3, these coefficients are compositively calculated on the basis of a value of the ENC 95 to obtain such a torque curve as mentioned above and then become the coefficients $K_1$ and $K_2$ for said control function.

In other words, the control torque, which is originally a counter measure to a great action such as a panning operation and has a negative effect on damping or the primary object, is made suitable for damping action with characteristics at telephotographing made weaker than at wide-angle photographing to be adopted for a condition of use of the optical apparatus, since it is known that unintentional vibration of the hands is generally more remarkable when a photo is taken with a telescope by the hands than with a wide angle.

Due to such arrangement, a damping optical apparatus can be compact and lightweight as a whole without spoiling the damping characteristics around the telescopic end.

This point will be described below in a little more detail.

Figure 13A:
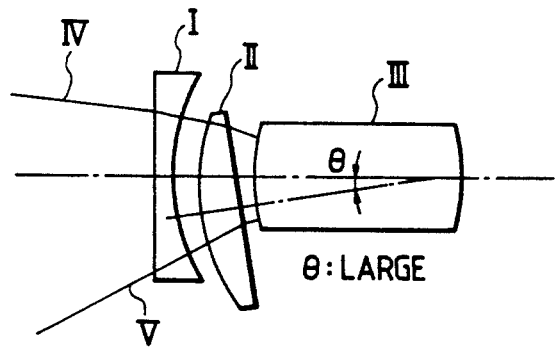
FIGS. 13A and 13B are views of an optical structure for explaining an effect in the example of FIG. 10.
Figure 13B:
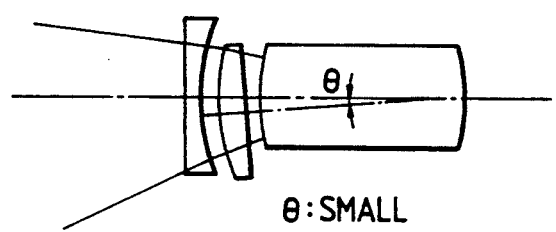

In FIGS. 13A and 13B, numerals I and II respectively denote first and second lens groups of a correcting optical system, similar to the lenses 1 and 2 in FIG. 1, III a main image pickup system, and IV and V respectively denote light beams outside the axis.

FIG. 13A shows a state in which an amount of vibration for damping of the second group is large, while FIG. 13B shows a state in which such amount is small.

A size of each lens for the first lens group and the second lens group of the damping optical system is determined on the basis of a height at which the light beams IV and V outside the axis pass through the lens system.

Therefore, as shown in FIGS. 13A and 13B, since the height at which the light beams outside the axis pass through the optical system becomes lower when the vibration angle $\theta$ is small than when the vibration angle $\theta$ is large, a size of the optical system can be made smaller.

The light beams outside the axis for determining the size of the optical system are normally light beams which form an image at the maximum image height at the wide angle end or in a zoom area near the wide angle end.

If light beams of the vibration angle is secured to a certain degree around the wide angle end, a sufficient damping range can be obtained, since the image angle becomes small around the telescopic end.

Accordingly, if the vibration angle at damping around the wide angle end is made smaller than that around the telescopic end due to said torque characteristics, the damping optical apparatus can be compact and lightweight as a whole without spoiling the damping characteristics around the telescopic end.

Description will be made below on an operation of the above-mentioned control system of FIG. 11 with reference to the flowchart in FIG. 11.

Step 101: Enter a value of the ENC 95 (ENC data) for detecting the focal distance.

Step 102: Specify the processing mode i as X in order to calculate a control torque signal for rotation around the X axis of the movable supporting member 3.

Step 103: Set the LUT selection mode j=1, and select which LUT storing a coefficient of said control function is to be used.

Step 104: Enter the output $\theta x$ from the sensor amplifier 33x according to a vibration angle of the movable supporting member 3 around the X axis as digital data via the A/D converter 511.

Step 105: Read the coefficients $K_1w$ and $K_1t$ which corresponds to said $\theta x$ out of LUT-1x-W and LUT-1x-T which store the coefficient $K_1$ of said control function for obtaining the control torque curve (a) at the wide angle end and the control torque curve (b) at the telescopic end as shown in FIG. 12 for rotation of the movable supporting member 3 around the X axis due to setting of the LUT selection mode j=1 in Step 103.

Step 106: Obtain the coefficient $K_1$ of said control function for the current focal length by a composition calculation according to the value of said ENC 95 for said coefficients $K_1w$ and $K_1t$.

Figure 14:
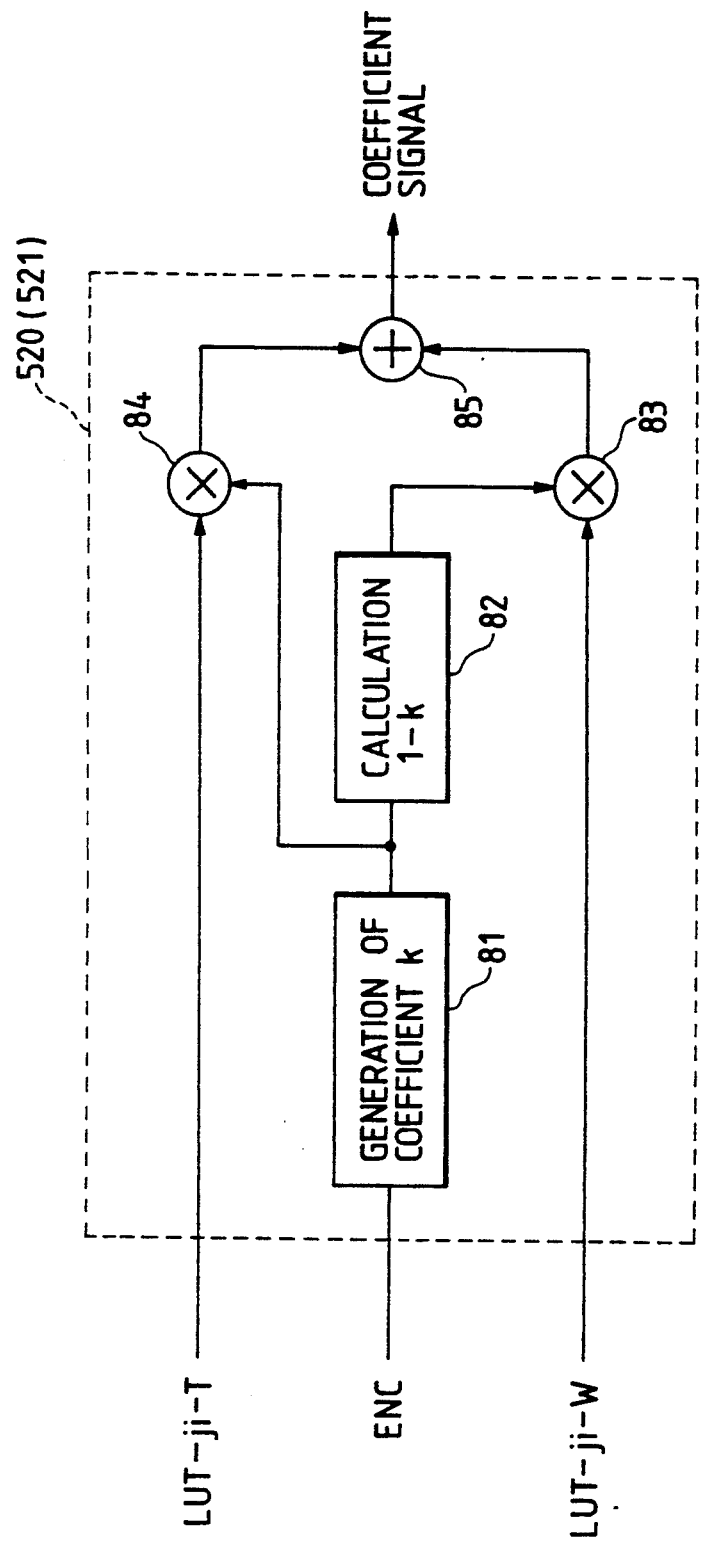
FIG. 14 is a view showing a structure of the control torque signal composition of FIG. 10.

An example of such composition calculation is shown in the form of hardware in FIG. 14.

In FIG. 14, the composition calculator 520 (as well as the composition calculator 521) comprises a coefficient generator 81 for generating the coefficient 1 corresponding to a resolving power of the ENC 95, a calculator 82 for generating a complementary number $1-1$ to 1, and multipliers 84 and 83 for calculating expressions, $K_1T*l$ and $K_1W*(1-l)$, and outputs the the coefficient $K_1$ corresponding to a focal length via an adder 85 for adding outputs from said multipliers.

In accordance with an output from the ENC 95, LUTs of the same number as the steps of the ENC (resolving power) may be prepared so that said composition calculation may be omitted.

Step 107: Confirm that the processing is finished both for setting of 1 and 2 for the LUT selection mode j.

If it is not finished (j =1), advance to Step 108.

Step 108: In Step 108, reset LUT selection mode j=2 and return to Step 105. Then, on the basis of the setting of the LUT selection mode j=2, read the coefficients $K_2W$ and $K_2T$ corresponding to said $\theta x$ out of LUT-2x-W and LUT-2x-T which store the coefficient $K_2$ of said control function for obtaining the control torque curve (a) at the wide angle end and the control torque curve (b) at the telescopic end as shown in FIG. 12 for rotation of the movable supporting member 3 around the X axis, so as to obtain the coefficient K$_2$ of said control function due to said composition calculation in Step 6.

Step 109: Differentiate said $\theta x$ (d$\theta x$/d$\theta$) to obtain data $\Delta$.

Step 110: Integrate said $\theta x$ (S$\theta x$d$\theta$( and multiply it by the constant K$_3$ to obtain data d1.

Make the coefficient K$_3$ a fixed small value to set the influence on the control system low. Then do not perform the non-linear operation unlike with the other coefficients K$_1$ and K$_2$.

Step 111: Multiply said $\theta x$ by the coefficient K$_1$ which has been obtained beforehand to obtain data d2.

Step 112: Multiply said $\theta x$ by the coefficient K$_1$ which has been obtained beforehand to obtain data d3.

Step 113: Add said data d1, d2 and d3 together to be temporarily stored as "DATA".

That is, a result of calculation of said control function can be obtained by the following expression $$\text{DATA} = d1 + d2 + d3 = K_1 * \theta x + K_2 * d\theta x/dt + K_3 * S\theta x dt$$

Step 114: Judge whether the current processing mode i is for rotation around the X axis or around the Y axis of the movable supporting member 3.

If the current processing is in an odd time, that the current processing mode i is for rotation around the X axis (in case of No) and the processing advances to Step 115, and if in an even time, it is for rotation around the Y axis (in case of Yes) and the processing advances to Step 117.

Step 115: Store "DATA" which is a result of calculation in DX as control torque data for rotation around the X axis.

Step 116: Change the processing mode i to y to return to Step 102, and then perform a processing for calculation of a control torque signal for rotation around the y axis of the movable supporting member 3 in the same manner as for rotation around the X axis.

In this case, however, in Step 105 the coefficients K$_1$w and K$_1$t corresponding to the vibration angle 0 of the movable supporting member 3 around the Y axis (hereinafter called "$\theta y$") is read out of LUT-1y-W and LUT-1y-T which store the coefficient K$_1$ of said control function for obtaining a control torque curve (a) at the wide angle end and a control torque curve (b) at the telescopic end as shown in FIG. 12 for rotation of the movable supporting member 3 around the Y axis, while the coefficients K$_1$w and K$_1$t corresponding to said $\theta y$ is read out of LUT-zy-W and LUT-zy-T which store the coefficient K$_2$ of said control function for obtaining a control torque curve (a) at the wide angle end and a control torque curve (b) at the telescopic end as shown in FIG. 12.

Step 117: Store "DATA" which is a result of calculation in Dy as control torque data for rotation around the Y axis.

Step 118: Output the control torque data Dx and Dy to the driving circuits 53x and 53y via the D/A converter 519 as torque control signals to effect torque control on rotation of the movable supporting member 3 around the X axis and the Y axis.

Step 119: Judge whether an image vibration correcting operation may be terminated or not.

If it may be terminated (if Yes), terminate the operation. Otherwise (if No), return to Step 101 to repeat the above operation to the end.

In such a manner, according to a torque curve of said control function for giving the stronger torque when the focal distance is from the telescopic end to the wide angle end, when the movable supporting member 3 comes close to the inner wall of the barrel 4 due to the panning or tilting operation, the torque which increases in a non-linear form for returning the movable supporting member to the central position of rotation is generated in the torque generators 41x, 42x and 43x for rotation of the X axis and in the torque generators 41y, 42y and 43y for rotation of the Y axis, whereby the movable supporting member 3 is returned to the center of rotation.

The foregoing embodiments employ an image stabilization apparatus of the inertial pendulum type. However, it is apparent that the present invention is applicable to other type of the image stabilization apparatus.

What is claimed is:

1. An image stabilizing apparatus of the inertial pendulum type for correcting vibration of an image, comprising:
    a correcting optical system for producing an image, said correcting optical system being able to compensate for vibration of the image;
    an adjusting optical system for varying a focal length of said correction optical system;
    a barrel for housing said correcting optical system, with said correcting optical system mounted for relative displacement within said barrel;
    detecting means for detecting the focal length of said correcting optical system;
    restriction means applying a correction force for restricting relative displacement of said correcting optical system within said barrel, with an amount of the correction force being varied in accordance with the relative displacement of said correcting optical system with respect to said barrel; and
    changing means for changing the amount of the correction force applied by said restriction means based on the focal length of said correcting optical system obtained by said detecting means.

2. An apparatus according to claim 1, wherein said changing means for increasing the amount of the correction force in accordance with a shortening of the focal length.

3. An apparatus according to claim 2, wherein said restriction means includes memory means for memorizing a relationship between the amount of the correction force and the relative displacement between said correcting optical system and said barrel.

4. An apparatus according to claim 3, wherein said memory means has memory data corresponding to different focal lengths.

5. An apparatus according to claim 1, wherein said restriction means includes memory means for memorizing a relationship between the amount of the correction force and the relative displacement between said correcting optical system and said barrel.

6. An apparatus according to claim 5, wherein said memory means has memory data corresponding to different focal lengths.

7. An apparatus according to claim 1, wherein said restriction means includes means for applying a force in the direction of a movement to said correcting optical system to restrict the relative displacement.

8. An image stabilizing apparatus of the inertial pendulum type for correcting vibration of an image, comprising:
- a correcting optical system for producing an image, said optical system being able to compensate for vibration of the image;
- a barrel for housing said correcting optical system, with said correcting optical system mounted for relative displacement in first and second directions within said barrel; and
- restriction means applying a correction force for restricting relative displacement of said correcting optical system within said barrel in the first and second directions, with a first amount of the correction force for restricting said relative displacement in the first direction and a second amount of the correction force for restricting and a second amount of the correction force for restricting said relative displacement in the second direction being varied in accordance with the position of said correcting optical system with respect to said barrel, said first amount of the correction force and second amount of the correction force being different from each other.

9. An apparatus according to claim 8, wherein the first direction in a yawing direction and the second direction is a pitching direction.

10. An apparatus according to claim 9, wherein said restriction means includes means for making the first amount of the correction force greater than the second amount of the correction force.

11. An apparatus according to claim 10, wherein said restriction means includes memory means for memorizing a relationship between the amount of the correction force and the relative displacement of said correcting optical system to said barrel.

12. An apparatus according to claim 11, wherein said memory means memorizes data corresponding to the first direction and the second direction.

13. An apparatus according to claim 8, wherein said restriction means includes memory means for memorizing a relationship between the amount of the correction force and the relative displacement of said correcting optical system to said barrel.

14. An apparatus according to claim 13, wherein said memory means memorizes data corresponding to the first direction and the second direction.

15. An apparatus according to claim 8, wherein said restriction means includes means for applying a force in the direction of movement to said correcting optical system to restrict the relative movement.

16. An image stabilizing apparatus for correcting vibration of an image, comprising:
- a correcting optical system for producing an image, said optical system being able to compensate for vibration of the image;
- an adjusting optical system for varying a focal length of said optical system;
- a barrel for housing said correction optical system, with said correcting optical system mounted for relative displacement within said barrel;
- detecting means for detecting the focal length of said optical system;
- restricting means applying a correction force for restricting relative displacement of said correcting optical system within said barrel; with an amount of the correction force being varied in accordance with relative displacement of said correcting optical system with respect to said barre; and
- changing means for changing the amount of the correction force applied by said restriction means based on the focal length of said correcting optical system obtained by said detecting means.

17. An apparatus according to claim 16, wherein said changing means includes means for increasing the amount of the correction force in accordance with a shortening of the focal length.

18. An apparatus according to claim 17, wherein said restriction means includes memory means for memorizing a relationship between the amount of the correction force and the relative displacement between said correcting optical system and said barrel.

19. An apparatus according to claim 18, wherein said memory means has memory data corresponding to different focal lengths.

20. An apparatus according to claim 16, wherein said restriction means includes memory means for memorizing a relationship between the amount of the correction force and the relative displacement between said correcting optical system and said barrel.

21. An apparatus according to claim 20, wherein said memory means has memory data corresponding to different focal lengths.

22. An apparatus according to claim 16, wherein said restriction means includes means for applying a force in the direction of a movement to said correcting optical system to restrict the relative displacement.

23. An image stabilizing apparatus for correcting vibration of an image, comprising:
- a correcting optical system for producing an image, said optical system being able to compensate for vibration of the image;
- a barrel for housing said correcting optical system, with said correcting optical system mounted for relative displacement in first and second directions within said barrel; and
- restriction means applying a correction force for restricting relative displacement of said correcting optical system within said barrel in the first and second directions, with a first amount of the correction force for restricting said relative displacement in the first direction and a second amount of the correction force for restricting said relative displacement in the second direction being varied in accordance with the position of said correcting optical system with respect to said barrel, said first amount of the correction force and second amount of the correction force being different from each other.

24. An apparatus according to claim 23, wherein the first direction is a yawing direction and the second direction is a pitching direction.

25. An apparatus according to claim 24, wherein said restriction means includes means for making the first amount of the correction force greater than the second amount of correction force.

26. An apparatus according to claim 25, wherein said restriction means includes memory means for memorizing a relationship between the amount of the correction force and the relative displacement of said correcting optical system to said barrel.

27. An apparatus according to claim 26, wherein said memory means memorizes data corresponding to the first direction and the second direction.

28. An apparatus according to claim 23, wherein said restriction means includes memory means for memorizing a relationship between the amount of the correction force and the relative displacement of said correcting optical system to said barrel.

29. An apparatus according to claim 28, wherein said memory means memorizes data corresponding to the first direction and the second direction.

30. An apparatus according to claim 23, wherein said restriction means includes means for applying a force in the direction of movement to said correcting optical system to restrict the relative displacement.

31. An image stabilizing apparatus of the inertial pendulum type for correcting vibration of an image, comprising:
- a correcting optical system for producing an image, said optical system being able to compensate for vibration of the image;
- a barrel for housing said correcting optical system, with said correcting optical system mounted for relative displacement within said barrel, said correction optical system being relatively displaceable for correcting the vibration of an image when said barrel is being vibrated; and
- restricting means applying a correction force for restricting relative displacement of said correcting optical system within said barrel, with an amount of the correction force being varied in accordance with relative displacement of said correcting optical system with respect to said barrel, wherein said restriction means includes a first magnetic element mounted on said correcting optical system and second magnetic element, connected to a signal line, mounted on said barrel.

32. An apparatus according to claim 31, wherein a magnet is used as said first magnetic element and a voice coil is used as said second magnetic element.

33. An optical apparatus having an image stabilizing device for correcting vibration of an image, comprising:
- an optical system including a correcting optical system for correcting vibration of the image and an adjusting optical system for varying a focal length;
- detecting means for detecting the focal length;
- restriction means applying a force for restricting relative displacement of said correcting optical system, with an amount of force being varied in accordance with relative displacement of said correcting optical system; and
- changing means for changing the amount of force applied by aid restriction means based on the focal length obtained by said detecting means.

34. An optical apparatus according to claim 33, wherein said changing means includes means for increasing the amount of force in accordance with a shortening of the focal length.

35. An optical apparatus according to claim 34, wherein said restriction means includes memory means for memorizing a relationship between the amount of force and the relative displacement of said correcting optical system.

36. An optical apparatus according to claim 35, wherein said memory means has memory data corresponding to different focal lengths.

37. An optical apparatus according to claim 33, wherein said restriction means includes memory means for memorizing a relationship between the amount of force and the relative displacement of said correcting optical system.

38. An optical apparatus according to claim 37, wherein said memory means has memory data corresponding to different focal lengths.

39. An optical apparatus having an image stabilizing device for correcting vibration of an image, comprising:
- an optical system including a correcting optical system for correcting vibration of the image;
- restriction means applying force for restricting relative displacement of said correcting optical system in first and second directions, with an amount of force being varied in accordance with the position of said correcting optical system; and
- changing means for changing the amount of force applied by said restriction means in the first and second directions based on the relative displacement of said correcting optical system.

40. An optical apparatus according to claim 39, wherein the first direction is a yawing direction and the second direction is a pitching direction.

41. An optical apparatus according to claim 40, wherein said changing means includes means for making the amount of force greater in the first direction than in the second direction.

42. An optical apparatus according to claim 41, wherein said restriction means includes memory means for memorizing a relationship between the amount of force and the relative displacement of said correcting optical system.

43. An optical apparatus according to claim 42, wherein said memory means memorizes data corresponding to the first direction and the second direction.

44. An optical apparatus according to claim 39, wherein said restriction means includes memory means for memorizing a relationship between the amount of force and the relative displacement of said correcting optical system.

45. An optical apparatus according to claim 44, wherein said memory means memorizes data corresponding to the first direction and the second direction.

* * * * *

UNITED STATES PATENT AND TRADEMARK OFFICE
CERTIFICATE OF CORRECTION

PATENT NO. : 5,243,462              Page 1 of 3
DATED     : September 7, 1993
INVENTOR(S) : Kobayashi, et al.

It is certified that error appears in the above-indentified patent and that said Letters Patent is hereby corrected as shown below: Title page, item:

[56] REFERENCES CITED:

U.S. PATENT DOCUMENTS, "2,829,557 1/1950 Jensen" should read --2,829,557 4/1958 Jensen--.

COLUMN 1:

Line 4, "continuation-in-part" should read --continuation--.
Line 38, "$F_1 = -f_2$" should read --$f_1 = -f_2$--.

COLUMN 2:

Line 6, "around" should read --thereabout--.

Figure 11:
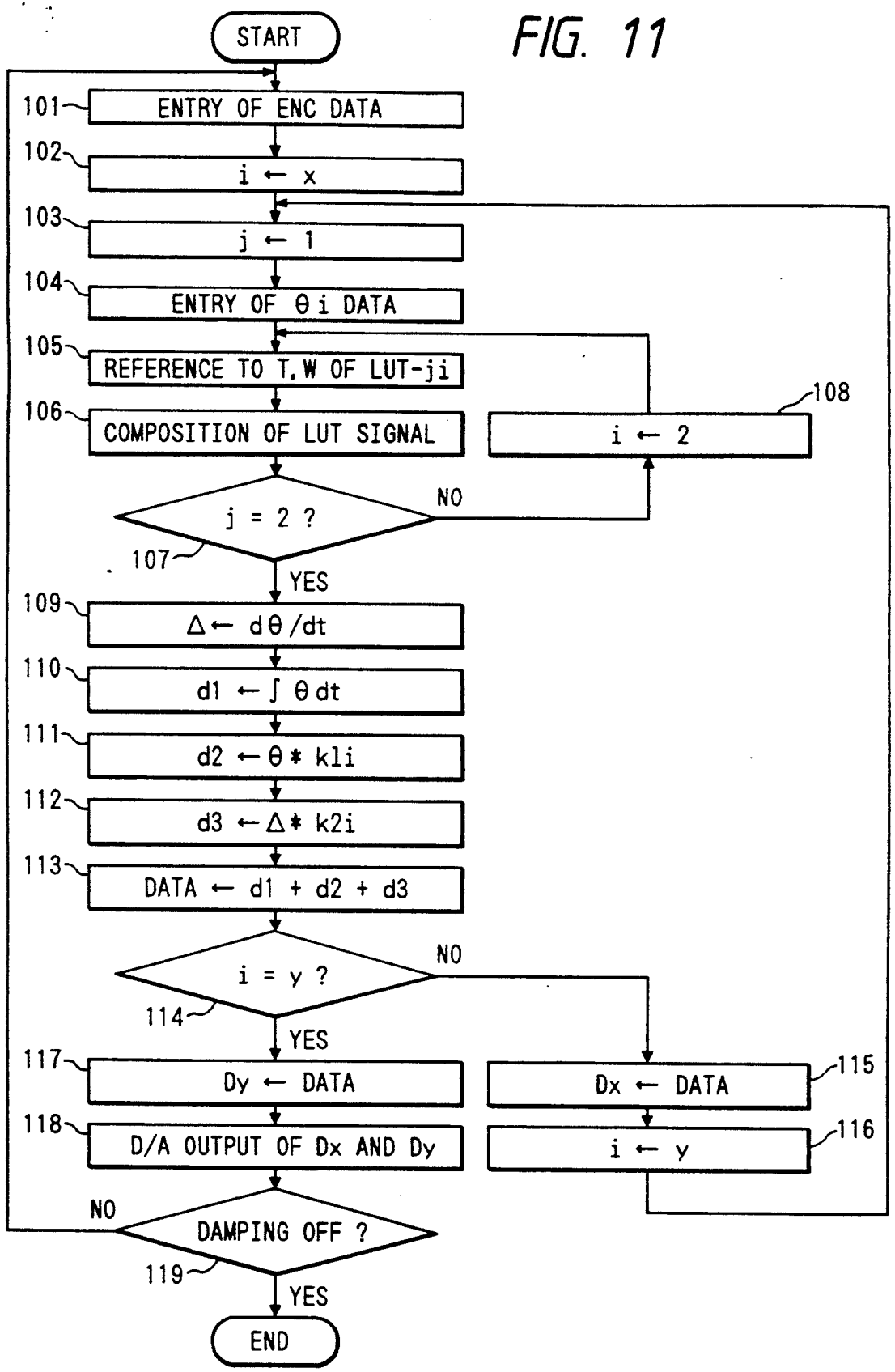
FIG. 11 is a flowchart showing an operation of the control system of FIG. 10.

COLUMN 3:

Line 68, "FIG. 15." should read --FIG. 11.--.

COLUMN 4:

Line 29, delete ", respective".
Line 45, "or" should read --of--.
Line 55, "contacting" should read --attractive--.

COLUMN 5:

Line 42, "respect" should read --respect to--.
Line 65, "or" should read --of--.

COLUMN 6:

Line 23, "multiplication/" should read --multiplication--.

UNITED STATES PATENT AND TRADEMARK OFFICE
CERTIFICATE OF CORRECTION

PATENT NO. : 5,243,462  Page 2 of 3
DATED : September 7, 1993
INVENTOR(S) : Kobayashi, et al.

It is certified that error appears in the above-indentified patent and that said Letters Patent is hereby corrected as shown below:

Line 35, "a" should be deleted.
Line 54, "is" should read --are--.

COLUMN 7:

Line 2, "cam coder" should read --camcorder--.
Line 12, "cam coder" should read --camcorder--.

COLUMN 8:

Line 12, "is i" should read --it is-- (see col. 11, line 33).
Line 15, "in DX" should read --in Dx--.
Line 22, "axis. coefficient" should read --axis.
¶ In this case, however, in Step 05, the coefficient--.
Line 25, " "$\theta y$" " should read --"$\theta y$")--.

COLUMN 10:

Line 8, "is" should read --are--.
Line 66, "$K_2W$ and $K_2T$" should read --$K_2w$ and $K_2t$--
(see col. 10, line 33).

COLUMN 11:

Line 8, "$(S\theta x d\theta($" should read --$(S\theta x c1\theta)$--.
Line 16, "said $\theta x$" should read --said $\Delta$-- and "coefficient $K_1$" should read --coefficient $K_2$--.
Line 37, "in DX" should read --in Dx-- (see col. 11, line 60).
Line 45, "angle 0" should read --angle $\theta$--.

COLUMN 12:

Line 46, "means" should read --means includes means--.

UNITED STATES PATENT AND TRADEMARK OFFICE
CERTIFICATE OF CORRECTION

PATENT NO. : 5,243,462
DATED : September 7, 1993
INVENTOR(S) : Kobayashi, et al.

It is certified that error appears in the above-indentified patent and that said Letters Patent is hereby corrected as shown below:

COLUMN 13:

Line 17, "and a second" should be deleted.
Line 18, "amount of the correcting force for restricting" should be deleted.
Line 26, "in" should read --is--.
Line 52, "movement." should read --displacement.--.
Line 60, "correction" should read --correcting--.
Line 67, "barrel'" should read --barrel,--;

COLUMN 14:

Line 2, "barre;" should read --barrel;--.

COLUMN 15:

Line 52, "aid" should read --said--.

Signed and Sealed this

Thirtieth Day of August, 1994

Attest:

BRUCE LEHMAN

*Attesting Officer*  *Commissioner of Patents and Trademarks*